US012340760B2

(12) United States Patent
Choi et al.

(10) Patent No.: US 12,340,760 B2
(45) Date of Patent: Jun. 24, 2025

(54) DISPLAY DEVICE AND DRIVING METHOD OF THE SAME

(71) Applicant: LG Display Co., Ltd, Seoul (KR)

(72) Inventors: Sung Wook Choi, Gyeonggi-do (KR); Kil Hwan Oh, Gyeonggi-do (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/534,835

(22) Filed: Dec. 11, 2023

(65) Prior Publication Data

US 2024/0221687 A1 Jul. 4, 2024

(30) Foreign Application Priority Data

Dec. 29, 2022 (KR) ........................ 10-2022-0189681

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2310/0275* (2013.01); *G09G 2310/08* (2013.01); *G09G 2320/0233* (2013.01)

(58) Field of Classification Search
CPC ................... G09G 3/3291; G09G 3/32; G09G 2310/0275; G09G 2310/08; G09G 2320/0233; G09G 3/3275; G09G 2300/0426; G09G 2310/027; G09G 2330/028; H10K 59/131
See application file for complete search history.

(56) References Cited

U.S. PATENT DOCUMENTS

2019/0157607 A1* 5/2019 Kim ..................... H10K 59/131
2020/0082761 A1* 3/2020 Kim ..................... G09G 3/3233
2024/0096279 A1* 3/2024 Lim ..................... G09G 3/2007

* cited by examiner

*Primary Examiner* — Premal R Patel
(74) *Attorney, Agent, or Firm* — Fish & Richardson P.C.

(57) ABSTRACT

A display device and a method of driving the same are provided. The display device includes a display panel including an active area and a non-active area, a low voltage line configured to supply a low voltage to the display panel, a timing controller configured to output a data signal for displaying an image on the display panel, and a data driver configured to convert the data signal into a data voltage to be supplied to the display panel and output the converted data voltage, wherein the data driver comprises a voltage compensator configured to prepare a compensation voltage for compensating for a rise of the low voltage, reflect the compensation voltage in the data voltage, and output the resultant voltage as a compensation data voltage. Accordingly, the present disclosure has an effect of being able to improve display quality by improving a problem of rising of the low voltage supplied to the display panel.

8 Claims, 14 Drawing Sheets

DISPLAY DEVICE AND DRIVING METHOD OF THE SAME

CROSS-REFERENCE TO RELATED APPLICATION

This application claims the priority of Korean Patent Application No. 10-2022-0189681, filed on Dec. 29, 2022, which is hereby incorporated by in its entirety.

BACKGROUND

Field of the Disclosure

The present disclosure relates to a display device and a method of driving the same.

Description of the Background

With the development of information technology, the market for display devices that are media for connection between users and information has been growing. Accordingly, display devices such as a light-emitting display (LED) device, a quantum dot display (QDD), and a liquid crystal display (LCD) have been increasingly used.

The above display devices each include a display panel including subpixels, a driver configured to output a driving signal for driving of the display panel, and a power supply configured to generate power to be supplied to the display panel or the driver.

In such a display device, when subpixels formed in a display panel are supplied with driving signals, for example, a scan signal and a data signal, a selected one thereof may transmit light therethrough or may directly emit light, thereby displaying an image.

SUMMARY

Accordingly, the present disclosure is directed to a display device and a method of driving the same that substantially obviate one or more problems due to limitations and disadvantages of the related art.

The present disclosure uniformizes display quality by improving a problem that luminance of the display panel decreases due to a rise of the low voltage as a distance from an input terminal of the low voltage increases and improves display quality. In addition, the present disclosure directly senses a low voltage line wired in a vertical direction within an active area and compensates for luminance non-uniformity caused by process deviation.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, a display device includes a display panel including an active area and a non-active area, a low voltage line configured to supply a low voltage to the display panel, a timing controller configured to output a data signal for displaying an image on the display panel, and a data driver configured to convert the data signal into a data voltage to be supplied to the display panel and output the converted data voltage, wherein the data driver comprises a voltage compensator configured to prepare a compensation voltage for compensating for a rise of the low voltage, reflect the compensation voltage in the data voltage, and output the resultant voltage as a compensation data voltage.

The voltage compensator may include a compensator configured to control the compensator.

The voltage compensator may include a first switch located between the low voltage line and the compensator to sense the low voltage, and the first switch may operate in response to a first switch signal output from the controller.

The compensator may include a plurality of capacitors connected in series to store a voltage for compensating for the rise of the low voltage.

The compensator may include a second switch configured to operate together with the first switch in response to a second switch signal output from the controller, and the first switch and the second switch may be simultaneously turned on to sense the low voltage.

The compensator may include a third switch configured to operate in response to a third switch signal output from the controller, and the third switch may be turned on so that a data voltage output from the controller is applied through an input terminal of the compensator.

The compensator may operate in response to a compensation control signal output from the controller and include a compensation voltage selector configured to select a voltage stored in at least one of the plurality of capacitors to read the selected voltage as a compensation voltage, and to reflect the read compensation voltage in the data voltage.

The timing controller may analyze the data signal input from outside to calculate an IR rise rate of different portions of the low voltage line corresponding to each pixel connected thereto and output a control signal for controlling the controller based on the IR rise rate.

The low voltage line may include a first low voltage line disposed in a first direction on one side of the non-active area, a second low voltage line located at an upper end of the non-active area, connected to the first low voltage line, and disposed in a second direction perpendicular to the first direction, and a plurality of third low voltage lines located in the active area, connected to the second low voltage line, and disposed in the first direction, and the voltage compensator may sense the low voltage supplied through each of the plurality of third low voltage lines.

In another aspect of the present disclosure, a method of driving a display device includes analyzing a data signal input from outside to calculate an IR rise rate of different portions of a low voltage line corresponding to each pixel connected thereto, selecting at least one voltage for compensating for a rise of a low voltage based on the IR rise rate and reading the selected voltage as a compensation voltage, reflecting the read compensation voltage in a data voltage and outputting the resultant voltage as a compensation data voltage, and driving a display panel based on the compensation data voltage.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate various aspects of the disclosure and together with the description serve to explain the principle of the disclosure.

In the drawings.

DETAILED DESCRIPTION

Reference will now be made in detail to the various aspects of the present disclosure, examples of which are illustrated in the accompanying drawings. Wherever possible, the same reference numbers will be used throughout the drawings to refer to the same or like parts.

A display device according to the present disclosure may be implemented as a television, a video player, a personal computer (PC), a home theater, an automotive electric device, or a smartphone, but is not limited thereto. The display device according to the present disclosure may be implemented as an LED device, a QDD, or an LCD. For convenience of description, an LED device that directly emits light based on an inorganic light-emitting diode or an organic light-emitting diode will hereinafter be taken as an example of the display device according to the present disclosure.

In addition, a thin film transistor (TFT) described below may be implemented as an n-type TFT, as a p-type TFT, or in a form in which n-type and p-type are present together. The TFT is a three-electrode element including a gate, a source, and a drain. The source is an electrode that supplies a carrier to a transistor. In the TFT, a carrier starts flowing from the source. The drain is an electrode through which a carrier exits the TFT. That is, in the TFT, a carrier flows from the source to the drain.

In the case of the p-type TFT, since the carrier is a hole, a source voltage is higher than a drain voltage so that the hole may flow from the source to the drain. In the p-type TFT, a hole flows from the source to the drain side, and thus current flows from the source to the drain side. In contrast, in the case of the n-type TFT, since an electron is a carrier, the source voltage is lower than the drain voltage so that an electron may flow from the source to the drain. In the n-type TFT, an electron flows from the source to the drain side, and thus current flows from the drain to the source side. However, the source and the drain of the TFT may be changed depending on the applied voltage. Reflecting this, in the following description, one of the source and drain will be described as a first electrode, and the other of the source and drain will be described as a second electrode.

Figure 1:
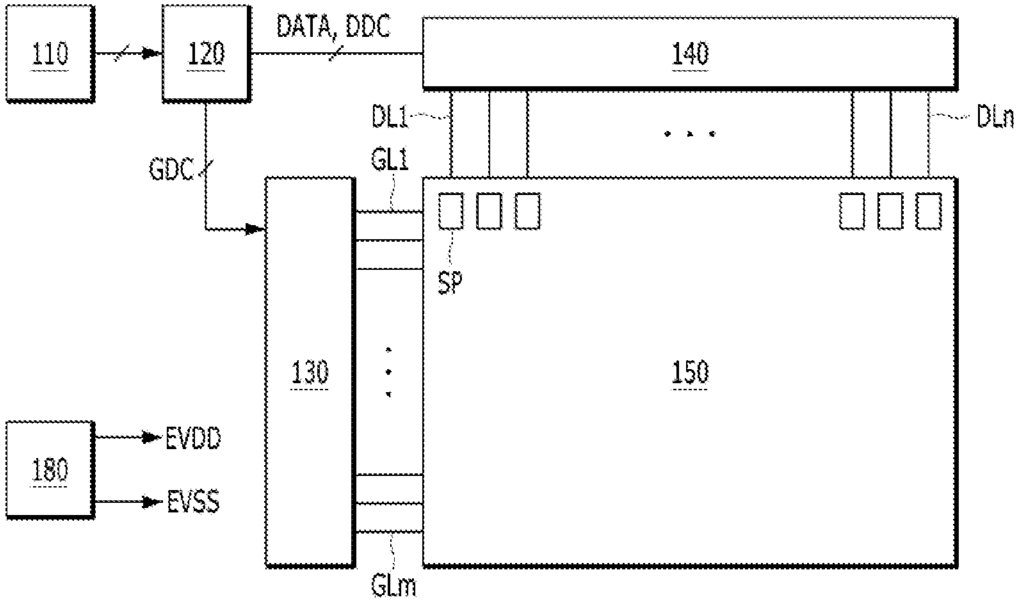
FIG. 1 is a block diagram schematically illustrating an LED device.
Figure 2:
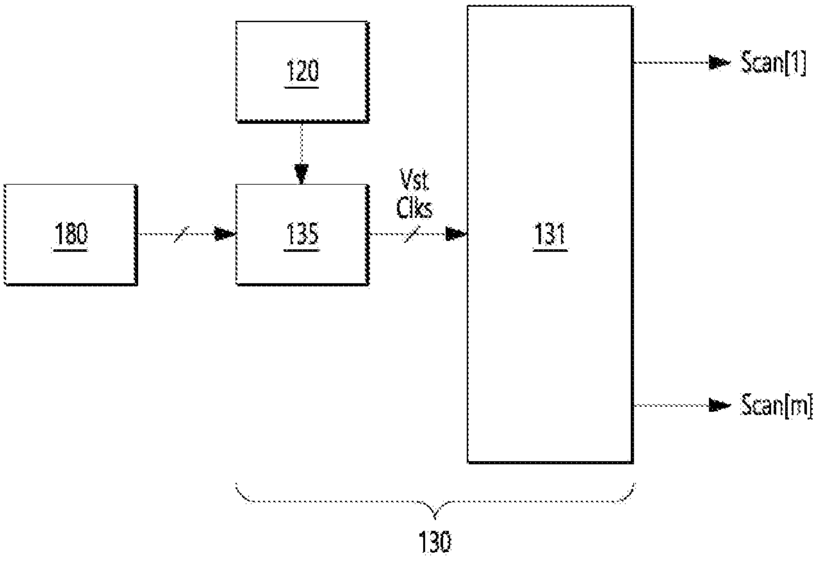
FIGS. 2 and 3 are diagrams for describing a configuration of a gate-in-panel (GIP) type scan driver.
Figure 3:
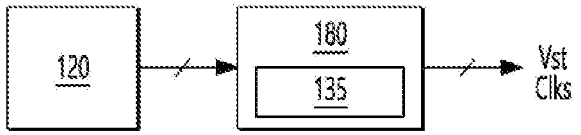

FIG. 1 is a block diagram schematically illustrating an LED device, and FIGS. 2 and 3 are diagrams for describing a configuration of a GIP type scan driver.

As illustrated in FIG. 1, the LED device may include an image supply 110, a timing controller 120, a scan driver 130, a data driver 140, a display panel 150, a power supply 180, etc.

The image supply (set or host system) 110 may output various driving signals together with an externally supplied image data signal or an image data signal stored in an internal memory. The image supply 110 may supply the data signal and the various driving signals to the timing controller 120.

The timing controller 120 may output a gate timing control signal GDC for control of operation timing of the scan driver 130, a data timing control signal DDC for control of operation timing of the data driver 140, and various synchronization signals (a vertical synchronization signal Vsync and a horizontal synchronization signal $H_{SYNC}$). The timing controller 120 may supply a data signal DATA supplied from the image supply 110 together with the data timing control signal DDC to the data driver 140. The timing controller 120 may take the form of an integrated circuit (IC) and be mounted on a printed circuit board but is not limited thereto.

The scan driver 130 may output a scan signal (or scan voltage) in response to the gate timing control signal GDC supplied from the timing controller 120. The scan driver 130 may supply the scan signal to subpixels included in the display panel 150 through gate lines GL1 to GLm. The scan driver 130 may take the form of an IC or may be formed directly on the display panel 150 in a GIP manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply the data voltage to the subpixels included in the display panel 150 through data lines DL1 to DLn. The data driver 140 may take the form of an IC and be mounted on the display panel 150 or on the printed circuit board, but is not limited thereto.

The power supply 180 may generate a high voltage and a low voltage based on an external input voltage supplied from the outside and output the high voltage and the low voltage through a high voltage line EVDD and a low voltage line EVSS. The power supply 180 may generate and output not only the high voltage and the low voltage, but also a voltage (for example, a gate high potential and a gate low voltage) required for driving the scan driver 130 or a voltage (for example, a drain voltage and a half drain voltage) required for driving the data driver 140.

The display panel 150 may display an image based on a driving signal including a scan signal and a data voltage, a high voltage, a low voltage, etc. Subpixels of the display panel 150 may directly emit light. The display panel 150 may be manufactured based on a rigid or flexible substrate of glass, silicon, polyimide, etc. In addition, subpixels emitting light may include pixels including red, green, and blue or pixels including red, green, blue, and white. For example, one subpixel SP may be connected to the first data line DL1, the first gate line GL1, the high voltage line EVDD, and the low voltage line EVSS.

Meanwhile, the timing controller 120, the scan driver 130, the data driver 140, etc., have been described as having individual configurations. However, one or more of the timing controller 120, the scan driver 130, and the data driver 140 may be integrated into one IC depending on the implementation scheme of the LED device.

As illustrated in FIGS. 2 and 3, the GIP-type scan driver may include a shift register 131 and a level shifter 135. The level shifter 135 may generate scan clock signals Clks, a start signal Vst, etc. based on signals and voltages output from the timing controller 120 and the power supply 180.

The shift register 131 may operate based on the signals Clks and Vst, etc. output from the level shifter 135, and output scan signals Scan[1] to Scan[m] capable of turning on or turning off transistors formed on the display panel. The shift register 131 may be formed in the form of a thin film on the display panel using a GIP method.

Unlike the shift register 131, the level shifter 135 may independently take the form of an IC or may be included in the power supply 180. However, this is merely one example, and the level shifter 135 is not limited thereto.

Figure 4:
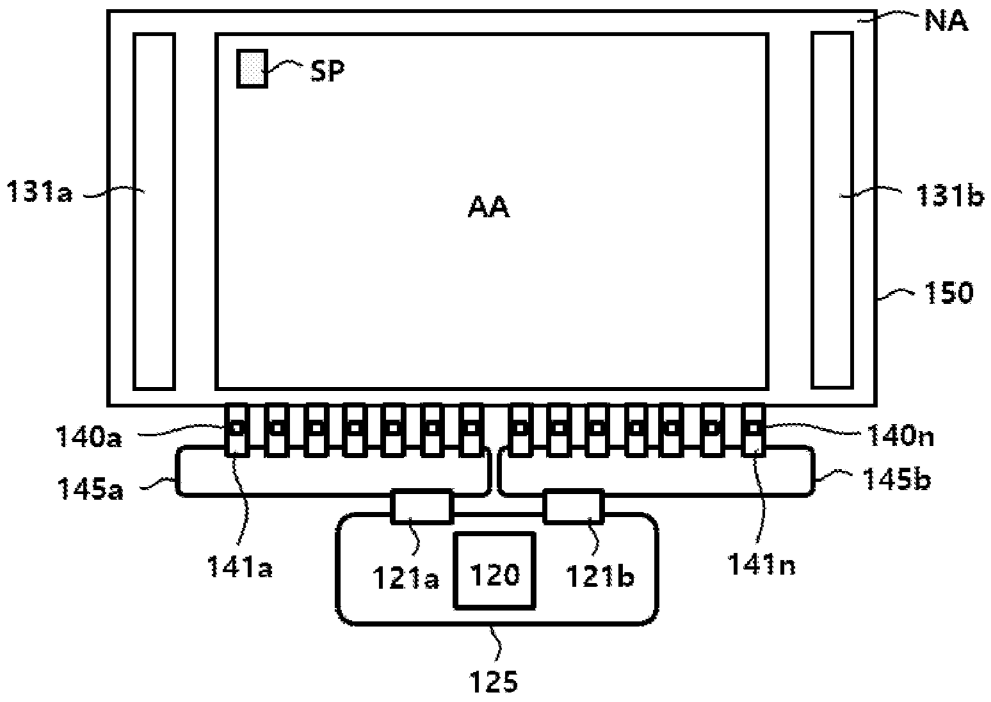
FIG. 4 is a module configuration diagram of the LED device.
Figure 5:
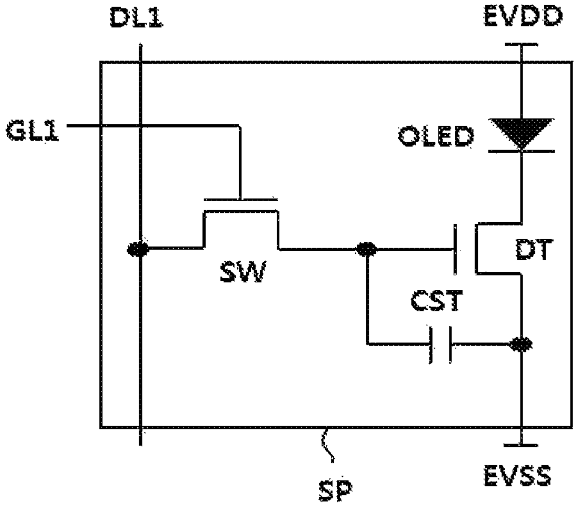
FIG. 5 is an illustrative circuit configuration diagram of a subpixel illustrated in FIG. 4.

FIG. 4 is a module configuration diagram of the LED device, and FIG. 5 is an illustrative circuit configuration diagram of a subpixel illustrated in FIG. 4.

As illustrated in FIG. 4, the display panel 150 may include an active area AA in which images are displayed and a non-active area NA in which images are not displayed. The subpixels SP may be located in the active area AA. In the non-active area NA, shift registers 131*a* and 131*b* configured to output scan signals from the GIP type scan driver may be located.

The display panel 150 may include a plurality of data drivers 140*a* to 140*n* mounted on a plurality of first circuit boards 141*a* to 141*n* and one timing controller 120 mounted on one control board 125. The plurality of data drivers 140*a* to 140*n* and the one timing controller 120 may be electrically connected by at least two second circuit boards 145*a* to 145*b* and at least two cables 121*a* to 121*b*. The plurality of first circuit boards 141*a* to 141*n* may be selected as flexible circuit boards, and the at least two second circuit boards 145*a* to 145*b* may be selected as printed circuit boards. However, the module configuration diagram illustrated in FIG. 4 is only for aiding in understanding, and the present disclosure is not limited thereto.

As illustrated in FIG. 5, a subpixel SP may include a switching transistor SW, a capacitor CST, a driving transistor DT, and an organic light-emitting diode OLED. The switching transistor SW and the driving transistor DT are n-type as an example. However, the present disclosure is not limited thereto.

The switching transistor SW may have a gate electrode connected to the first gate line GL1, a first electrode connected to an Nth data line DLn, and a second electrode connected to a gate electrode of a driving transistor DT. The switching transistor SW may serve to transfer a data voltage applied through a first data line DL1 to a first electrode of the capacitor CST.

The capacitor CST may have the first electrode connected to the gate electrode of the driving transistor DT, and a second electrode connected to a second electrode of the driving transistor DT and the low voltage line EVSS. The capacitor CST may serve to store a data voltage for driving the driving transistor DT.

The driving transistor DT may have the gate electrode connected to the first electrode of the capacitor CST, the first electrode connected to a cathode of the organic light-emitting diode OLED, and the second electrode connected to the low voltage line EVSS. The driving transistor DT may serve to generate a driving current in response to a data voltage stored in the capacitor CST.

The organic light-emitting diode OLED may have an anode connected to the high voltage line EVDD and a cathode connected to the first electrode of the driving transistor DT. The organic light-emitting diode OLED may serve to emit light in response to operation (driving current) of the driving transistor DT.

Figure 6:
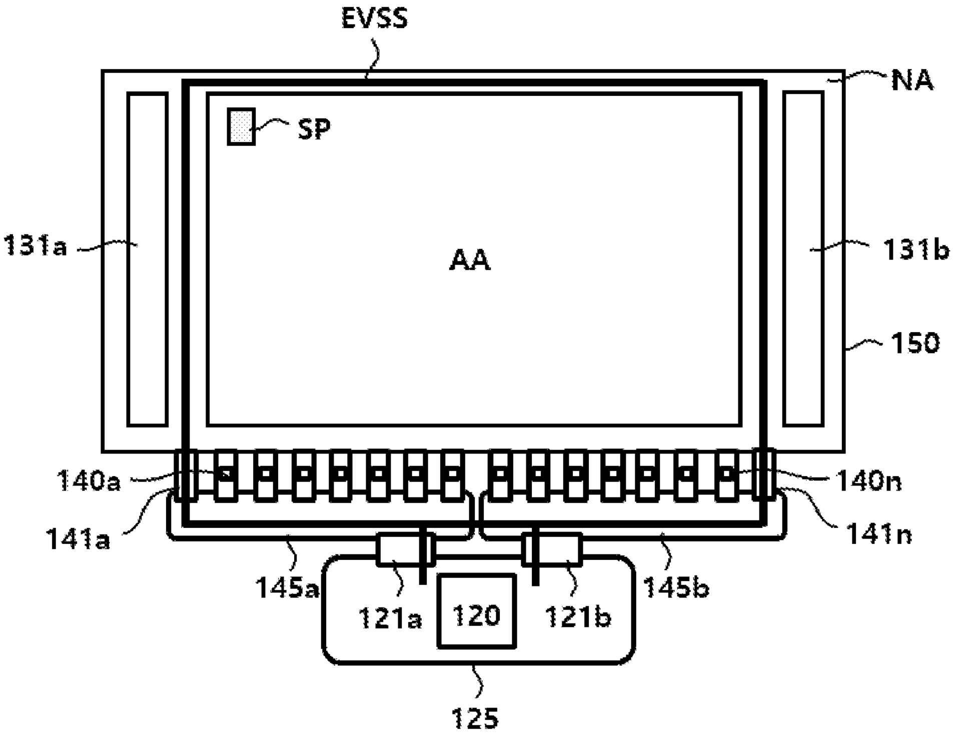
FIG. 6 is a diagram illustrating an arrangement state of a low voltage line of an LED device according to a first aspect of the present disclosure.
Figure 7:
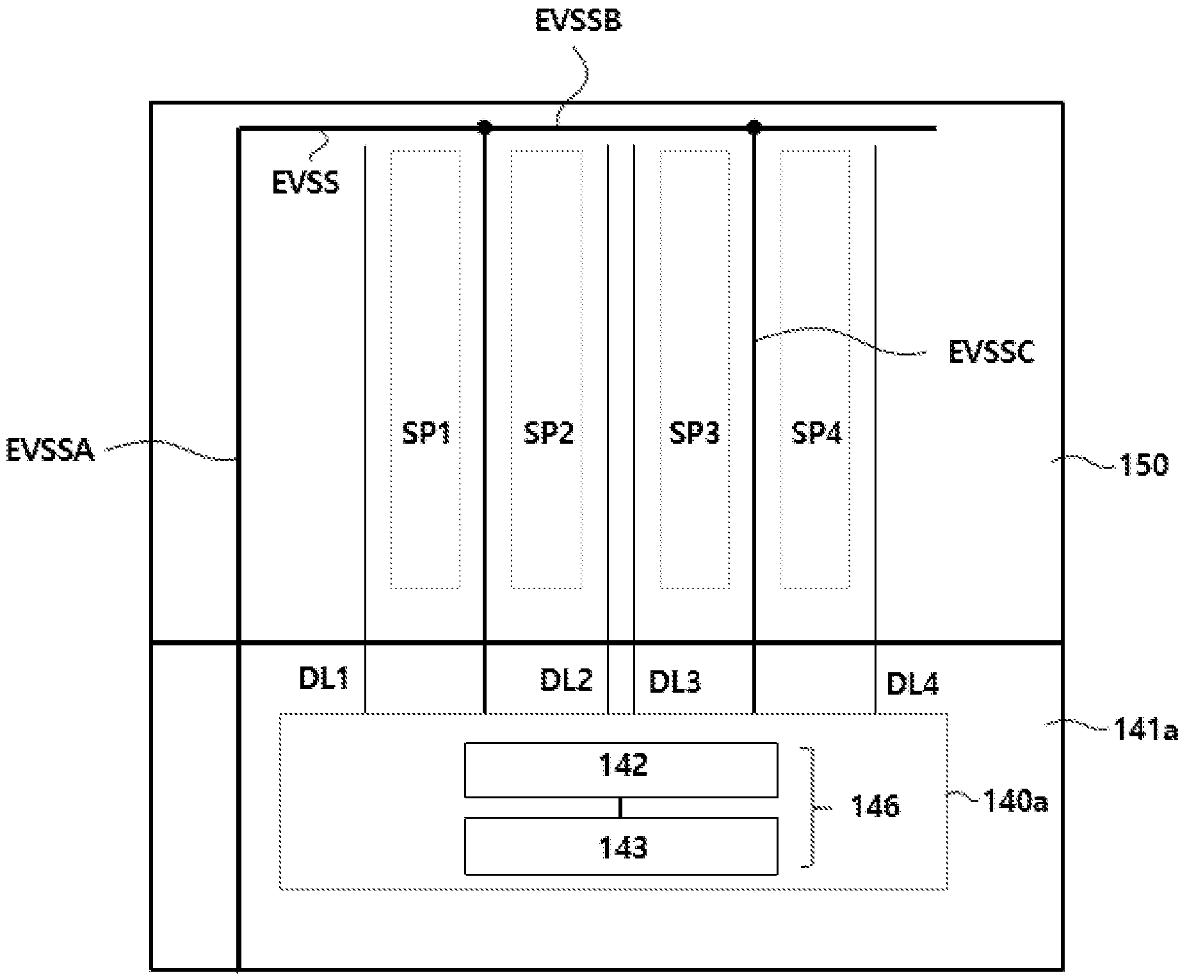
FIGS. 7 and 8 are diagrams for briefly describing a voltage compensator according to the first aspect of the present disclosure.
Figure 8:
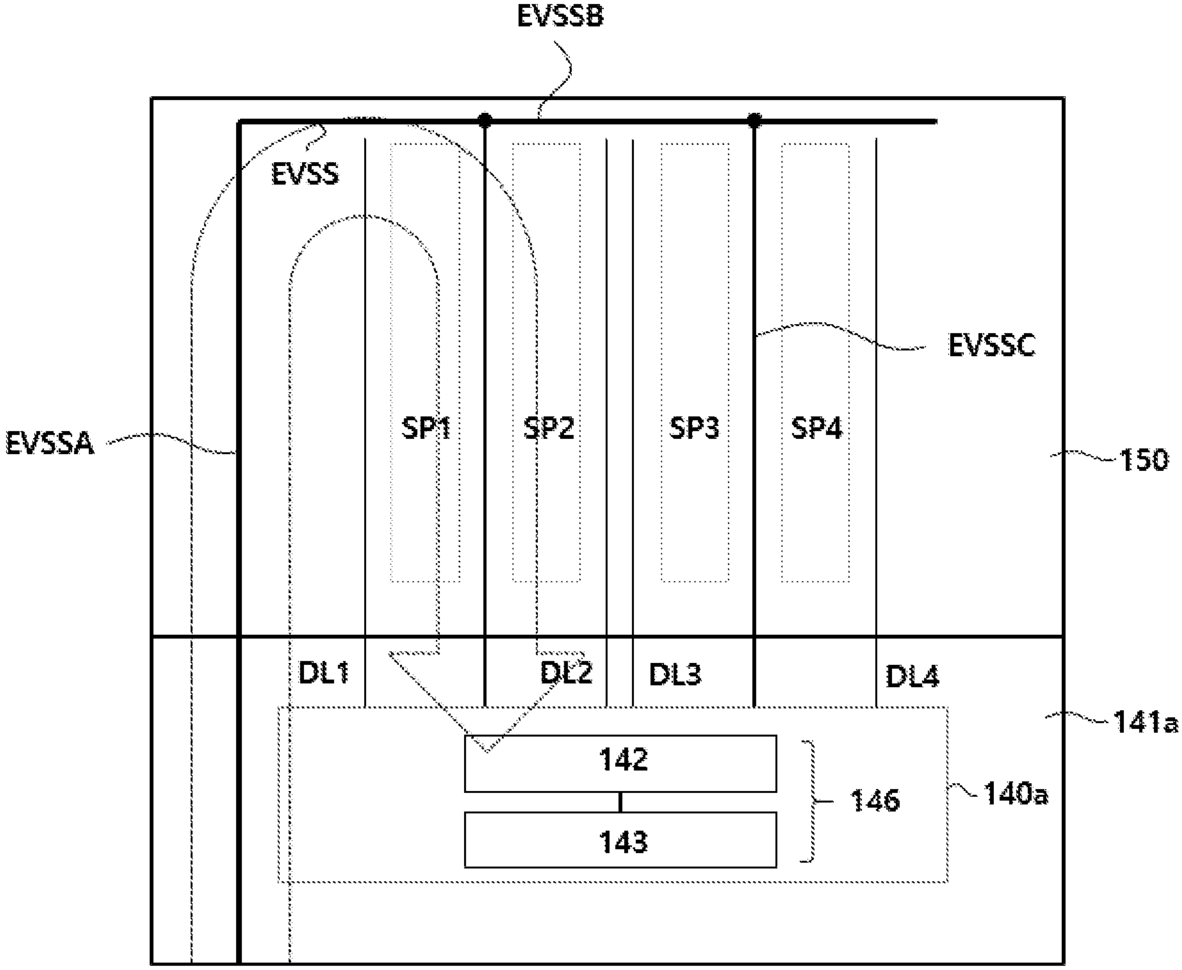
Figure 9:
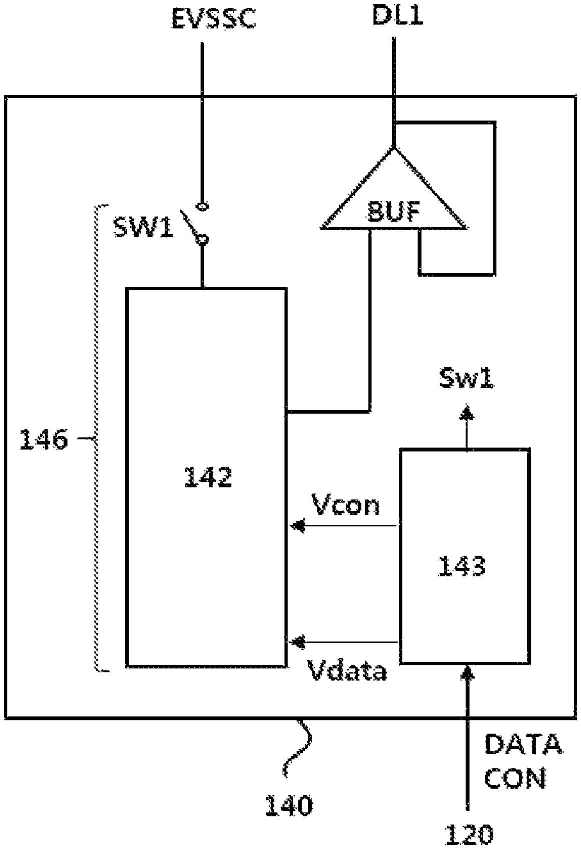
FIG. 9 is a detailed configuration diagram of the voltage compensator according to the first aspect of the present disclosure.
Figure 10:
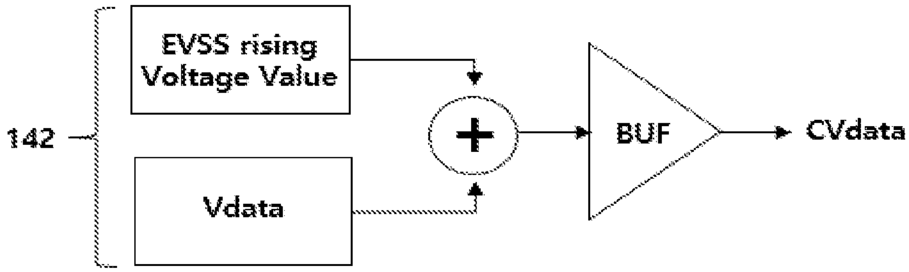
FIG. 10 is a diagram for describing a compensation operation of the voltage compensator illustrated in FIG. 9.

FIG. 6 is a diagram illustrating an arrangement state of a low voltage line of an LED device according to a first aspect of the present disclosure, FIGS. 7 and 8 are diagrams for briefly describing a voltage compensator according to the first aspect of the present disclosure, FIG. 9 is a detailed configuration diagram of the voltage compensator according to the first aspect of the present disclosure, and FIG. 10 is a diagram for describing a compensation operation of the voltage compensator illustrated in FIG. 9.

As illustrated in FIG. 6, according to the first aspect of the present disclosure, the low voltage line EVSS transmitting a low voltage may be disposed on the display panel 150, the plurality of first circuit boards 141*a* to 141*n*, the at least two second circuit boards 145*a* and 145*b*, the at least two cables 121*a* and 121*b*, and the control board 125.

The low voltage line EVSS may be disposed to surround at least three sides of the active area AA. The low voltage line EVSS may be connected to the 2-1st circuit board 145*a* and the 2-2nd circuit board 145*b* through the 1-1st circuit board 141*a* and the 1-Nth circuit board 141*n* disposed at outermost portions of both lower ends of the display panel 150. The low voltage line EVSS may be connected to the control board 125 through the 1-1st cable 121*a* and the 1-2nd cable 121*b*. Meanwhile, even though FIG. 6 illustrates an example in which only the low voltage line EVSS is located on the 1-1st circuit board 141*a* and the 1-Nth circuit board 141*n*, the data driver may also be located thereon.

As illustrated in FIG. 7, the low voltage line EVSS may include a first low voltage line EVSSA, a second low voltage line EVSSB, and a third low voltage line EVSSC. The first low voltage line EVSSA may be vertically disposed in the non-active area on one side of the display panel 150. The second low voltage line EVSSB may be connected to the first low voltage line EVSSA and horizontally disposed in the non-active area at an upper end of the display panel 150. The third low voltage line EVSSC may be connected to the second low voltage line EVSSB and vertically disposed between subpixels (for example, SP1 and SP2) located in the active area of the display panel 150.

As illustrated in FIG. 8, when the low voltage line EVSS is disposed, a low voltage may be supplied through an upper end of the active area AA, and low voltages supplied in a vertical direction through the third low voltage line EVSSC may be separately sensed for each third low voltage line EVSSC. In addition, all low voltages supplied in the vertical direction may be simultaneously or sequentially sensed.

Like the first data driver 140*a* illustrated in FIGS. 7 and 8, each of a plurality of data drivers may include a voltage compensator 146. The voltage compensator 146 may serve to separately sense low voltages supplied through the low voltage line EVSS for each third low voltage line EVSSC, and compensate for deviation for each pixel.

The voltage compensator 146 may include a compensator 142 and a controller 143. The compensator 142 may serve to separately sense low voltages supplied through the third low voltage line EVSSC for each third low voltage line EVSSC, and compensate for deviation for each pixel.

The compensator 142 may sense the third low voltage line EVSSC to measure a rise of the low voltage to be supplied to an actual active area (a rise according to wiring resistance). To this end, the compensator 142 may include a circuit such as an analog-to-digital converter. The compensator 142 may sense the third low voltage line EVSSC and prepare a compensation voltage capable of compensating for a rise of the low voltage to be supplied to the actual active area. The compensation voltage capable of compensating for the rise of the low voltage may be prepared based on experimental or simulation results obtained in advance.

The controller 143 may serve to control the compensator 142 so that the compensation voltage for compensating for a deviation of the low voltages is reflected in the data voltages output from the data lines DL1 to DL4 of the data driver. Hereinafter, the third low voltage line EVSSC will be named and described as a vertical low voltage line.

As illustrated in FIG. 9, the voltage compensator 146 may include a first switch SW1 located between the vertical low voltage line EVSSC and the compensator 142. The first switch SW1 may be turned on to sense a low voltage of one line through the vertical low voltage line EVSSC.

The controller 143 may generate and output a first switch signal Sw1 for controlling the first switch SW1. The controller 143 may generate and output a data voltage Vdata to be used for a compensation operation of the compensator 142 and a compensation control signal Vcon for controlling the compensator 142.

The controller 143 may generate the compensation control signal Vcon based on a digital data signal DATA supplied from the timing controller 120 and a control signal CON. Meanwhile, the data voltage Vdata may be converted into an analog data voltage by a circuit included in the data driver 140 and then delivered to the controller 143.

As illustrated in FIGS. 9 and 10, the compensator 142 operates based on the compensation control signal Vcon output from the controller 143, and may generate a compensation data voltage CVdata by reflecting, in the data voltage Vdata, a compensation voltage capable of compensating for deviation according to a rise of the low voltage (EVSS rising voltage value). The compensation data voltage CVdata generated by the compensator 142 may be output through a buffer BUF and supplied to the data line.

Figure 11:
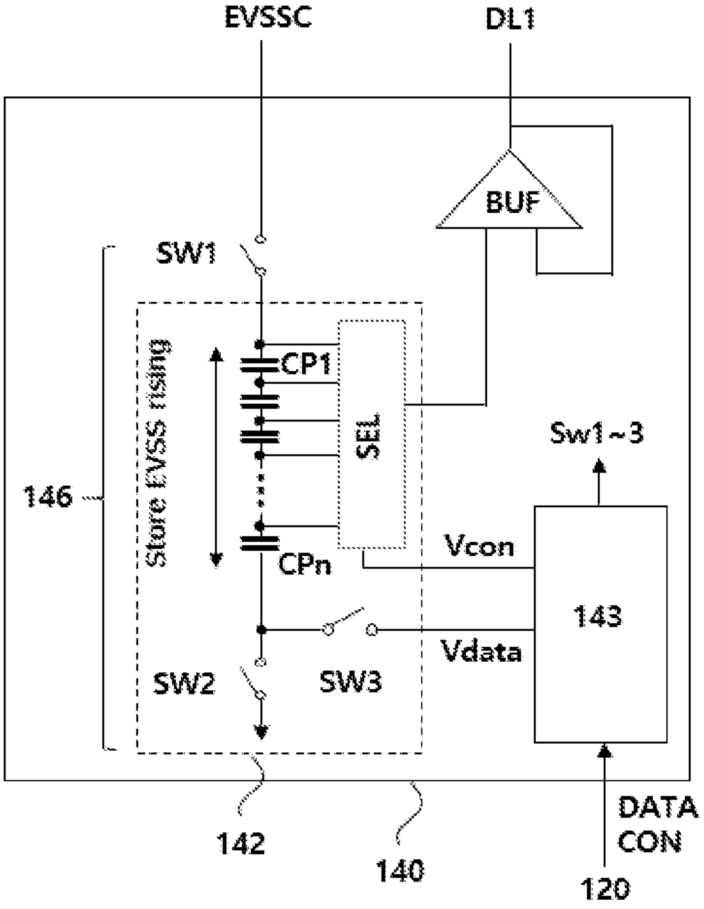
FIG. 11 is a detailed configuration diagram of a voltage compensator according to a second aspect of the present disclosure.
Figure 12:
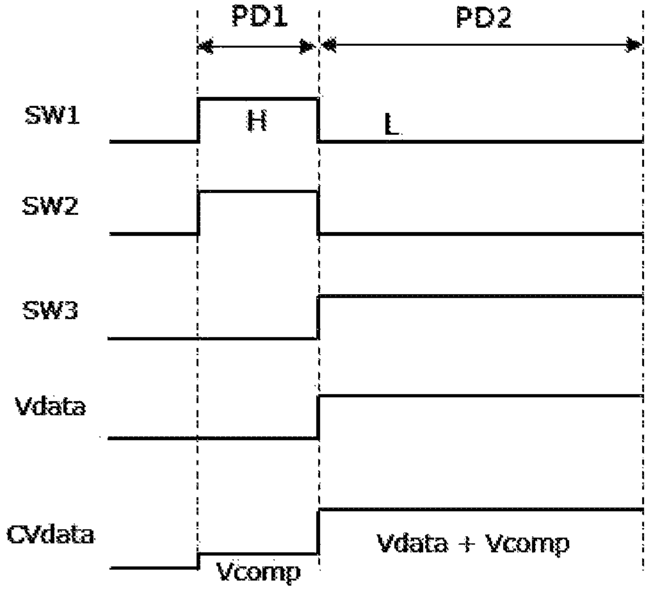
FIG. 12 is a driving waveform diagram of the voltage compensator according to the second aspect of the present disclosure.
Figure 13:
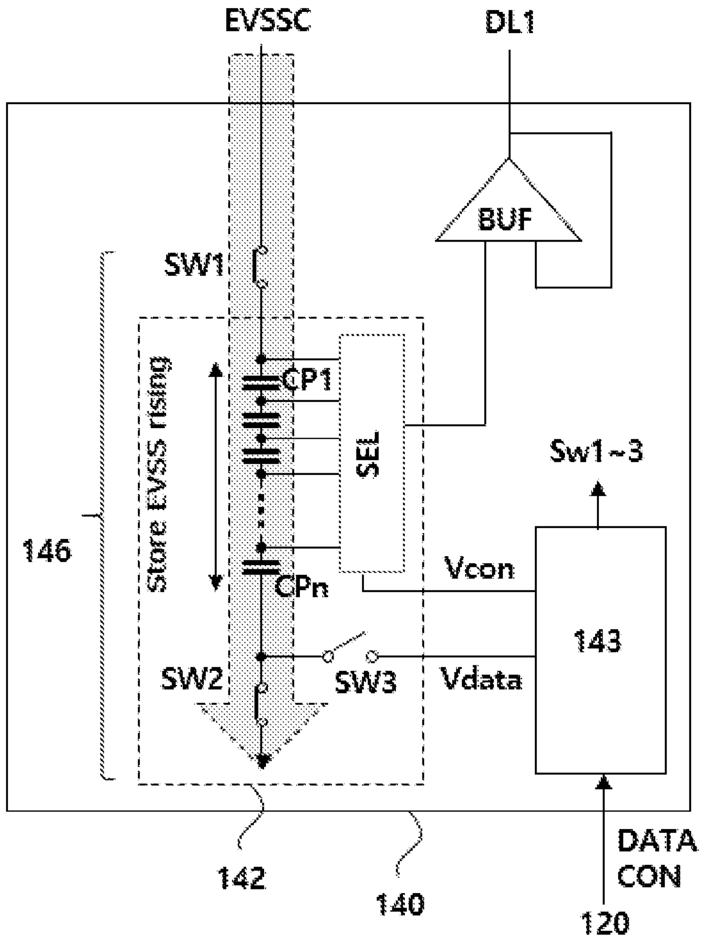
FIGS. 13 and 14 are diagrams illustrating an operation state of the voltage compensator according to a driving waveform of FIG. 12.
Figure 14:
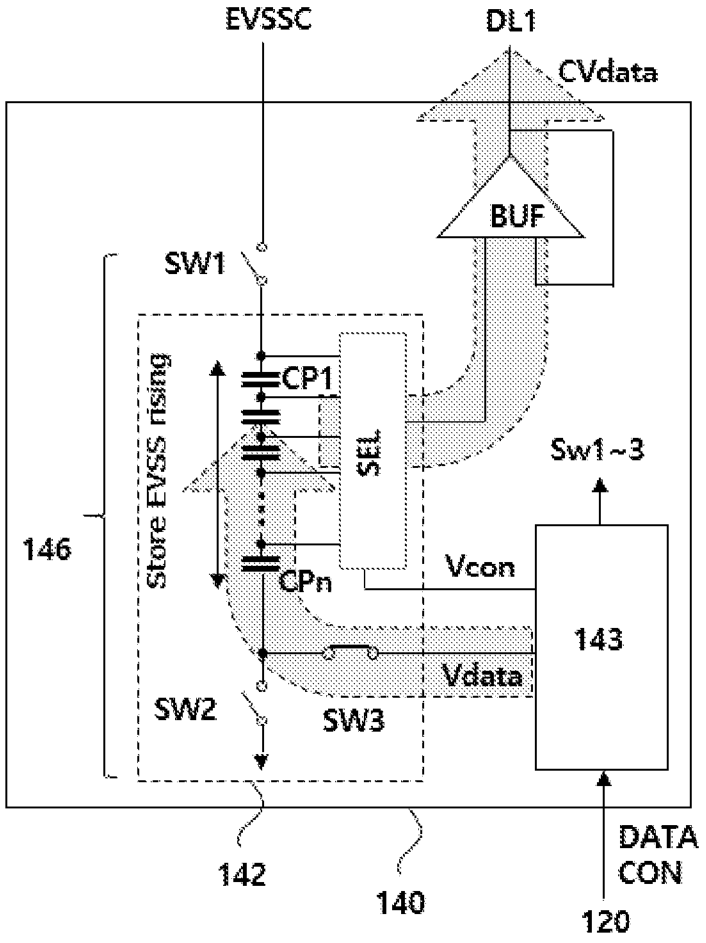
Figure 15:
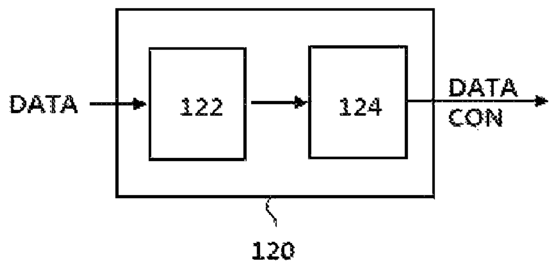
FIG. 15 is a configuration diagram of a timing controller according to the second aspect of the present disclosure.
Figure 16:
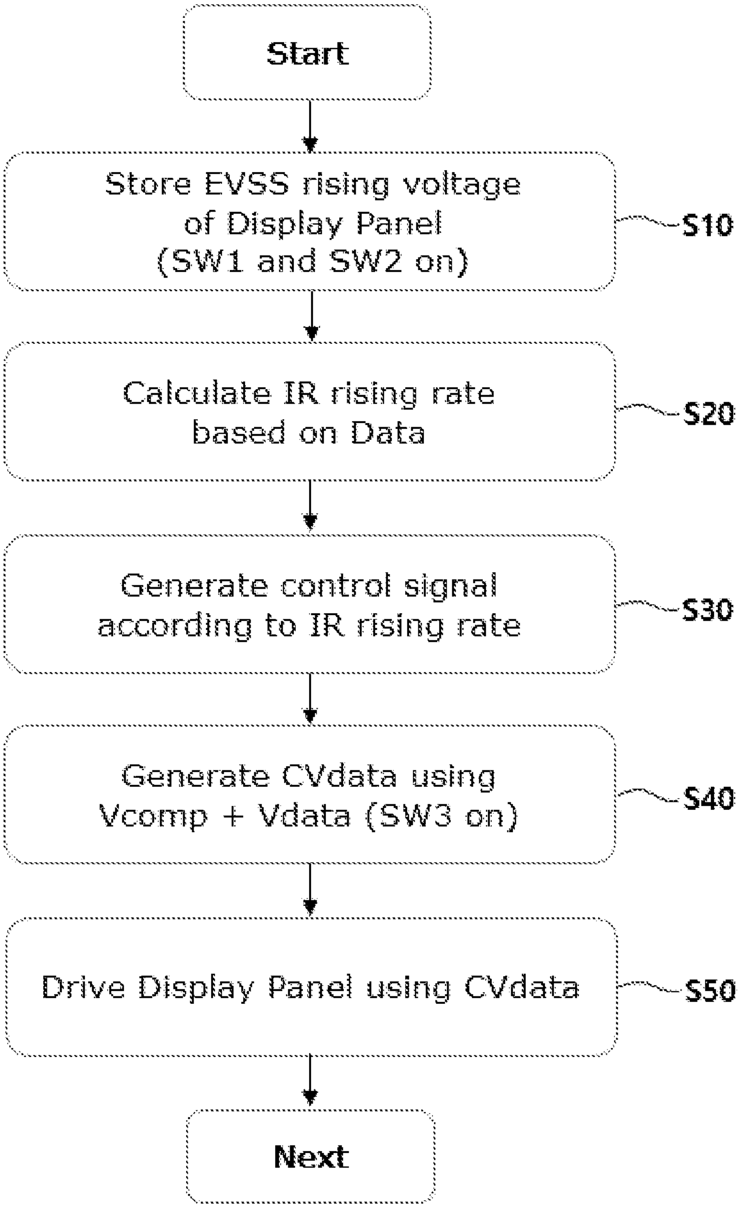
FIGS. 16 and 17 are diagrams for describing a voltage compensation example using the second aspect of the present disclosure.
Figure 17:
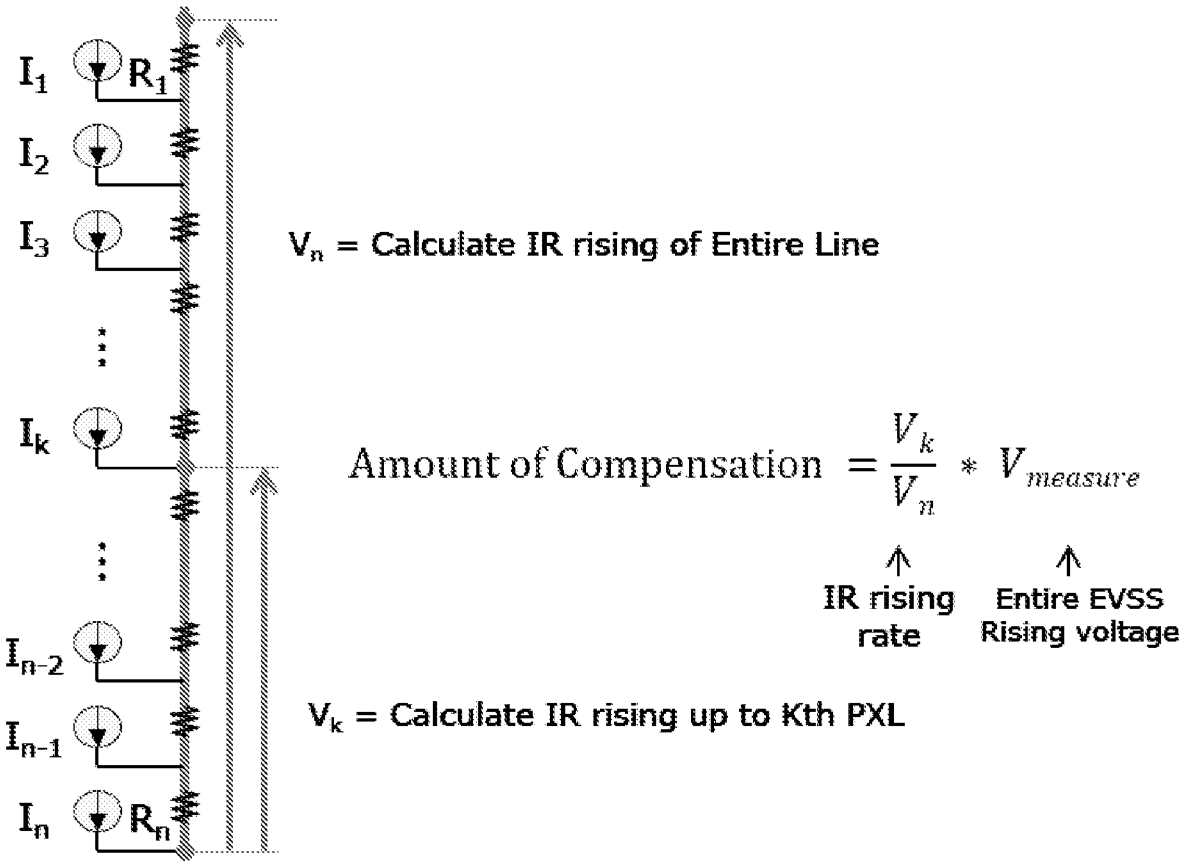

FIG. 11 is a detailed configuration diagram of a voltage compensator according to a second aspect of the present disclosure, FIG. 12 is a driving waveform diagram of the voltage compensator according to the second aspect of the present disclosure, FIGS. 13 and 14 are diagrams illustrating an operation state of the voltage compensator according to a driving waveform of FIG. 12, FIG. 15 is a configuration diagram of a timing controller according to the second aspect of the present disclosure, and FIGS. 16 and 17 are diagrams for describing a voltage compensation example using the second aspect of the present disclosure.

As illustrated in FIG. 11, according to the second aspect of the present disclosure, the compensator 142 may include a second switch SW2, a third switch SW3, compensation voltage storage units CP1 to CPn, a compensation voltage selector SEL, etc.

The compensation voltage storage units CP1 to CPn may each serve to store a voltage capable of compensating for deviation according to a rise of the low voltage (EVSS rising voltage value). To this end, the compensation voltage storage units CP1 to CPn may include a first capacitor CP1 to an Nth capacitor CPn connected in series, etc. Here, the same number as the number of gate lines or a number smaller than the number of gate lines may be selected as n. That is, the number equal to or smaller than the number of the pixels connected to one vertical low voltage line EVSSC may be selected as n.

However, in the following description, as an example, the number of capacitors CP1 to CPn and the number of gate lines are the same so that all rises of low voltages generated across the one vertical low voltage line EVSSC are stored. Meanwhile, note that FIG. 11 illustrates a circuit configuration relatively simplified to show a concept that voltages stored in the compensation voltage storage units CP1 to CPn are selectively read by an operation of the compensation voltage selector SEL and reflected in the data voltage Vdata.

The second switch SW2 may be turned on together with the first switch SW1 so that a voltage capable of compensating for deviation due to a rise of the low voltage is stored in each of the compensation voltage storage units CP1 to CPn. The second switch SW2 may be turned on based on a second switch signal Sw2 output from the controller 143.

The third switch SW3 may operate to transfer the data voltage Vdata output from the controller 143 to input terminals of the compensation voltage storage units CP1 to CPn. The third switch SW3 may be turned on based on a third switch signal Sw3 output from the controller 143.

The compensation voltage selector SEL may operate based on the compensation control signal Vcon output from the controller 143. The compensation voltage selector SEL may serve to select a voltage stored in at least one of the first capacitor CP1 to the Nth capacitor CPn included in the compensation voltage storage units CP1 to CPn as a compensation voltage based on the compensation control signal Vcon, reflect the selected compensation voltage in the data voltage Vdata, and output the resultant voltage.

As illustrated in FIGS. 11 and 12, the voltage compensator 146 may separately operate in a first period PD1 and a second period PD2. The first period PD1 may be a period for preparing a compensation voltage Vcomp capable of compensating for the deviation according to the rise of the low voltage, and the second period PD2 may be a period for outputting the compensation data voltage CVdata.

As illustrated in FIGS. 12 and 13, during the first period PD1, the first switch SW1 and the second switch SW2 may be simultaneously turned on in response to the first switch signal Sw1 and the second switch signal Sw2 at high voltages H. At this time, the third switch SW3 may be turned off in response to the third switch signal Sw3 at a low voltage L.

When the first switch SW1 and the second switch SW2 are turned on, the rise of the low voltage caused by the IR of different portions of the vertical low voltage line EVSSC corresponding to each pixel connected thereto may be distributed to and stored in the first capacitor CP1 to the Nth capacitor CPn. To separately store the rise of the low voltage caused by the IR of different portions of the vertical low voltage line EVSSC corresponding to each pixel connected thereto in the first capacitor CP1 to the Nth capacitor CPn, scan signals may be sequentially applied to the display panel for each gate line.

As illustrated in FIGS. 12 and 14, during the second period PD2, the third switch SW3 may be turned on in response to the third switch signal Sw3 at a high voltage H. At this time, the first switch SW1 and the second switch SW2 may be simultaneously turned off in response to the first switch signal Sw1 and the second switch signal Sw2 at low voltages L.

When the third switch SW3 is turned on, the data voltage Vdata may be delivered to an input terminal of the compensator 142. In addition, the compensation voltage selector SEL may select a voltage stored in at least one of the first capacitor CP1 to the Nth capacitor CPn as the compensation voltage Vcomp in response to the compensation control signal Vcon output from the controller 143, and reflect the compensation voltage Vcomp in the data voltage Vdata (Vdata+Vcomp) to prepare the compensation data voltage CVdata. Further, the compensation voltage selector SEL may transfer the compensation data voltage CVdata to an input terminal of the buffer BUF.

As illustrated in FIGS. 11 and 15, the timing controller 120 may include a compensation rate calculator 122 and a signal output unit 124. The compensation rate calculator 122 may analyze the data signal DATA input from the outside, and calculate a rate (0 to 1) of the rise of the IR of different portions of each vertical low voltage line EVSSC corresponding to each pixel connected thereto. In addition, the compensation rate calculator 122 may generate the control signal CON for controlling the compensation voltage selector SEL, etc. to be able to prepare a compensation voltage capable of compensating for deviation caused by the rise of the low voltage according to the IR rising rate in the voltage compensator 146 included in the data driver 140.

The signal output unit 124 may configure the data signal DATA and the control signal CON delivered from the compensation rate calculator 122 in response to a transmission method (communication method) arranged with the data driver 140, and then output the signals.

Meanwhile, in the above description, the configurations of the timing controller 120 and the data driver 140 have been separately described. However, since the timing controller 120, the data driver 140, etc. may be integrated into one IC according to an implementation method of the LED device, components capable of compensating for the deviation due to the rise of the low voltage may be included in one device.

As illustrated in FIGS. 11 to 17, the vertical low voltage line EVSSC of the display panel may be sensed, and a voltage capable of compensating for a rise of the low voltage (EVSS rising voltage) of the display panel may be stored in each of the compensation voltage storage units CP1 to CPn (S10). To this end, the first switch SW1 and the second switch SW may be turned on.

The data signal DATA may be analyzed, and an IR rising rate of different portions of each vertical low voltage line EVSSC corresponding to each pixel connected thereto may be calculated based thereon (S20). In addition, to prepare a compensation voltage capable of compensating for deviation according to the IR rising rate, the control signal CON for controlling the compensation voltage selector SEL, etc. may be generated (S30).

Meanwhile, a method of calculating the IR rising rate of different portions of the vertical low voltage line EVSSC corresponding to each pixel connected thereto and an equation for calculating a compensation amount based thereon may be obtained with reference to FIG. 17. In FIG. 17, $V_k$ may be defined as a computed value of an IR rise up to a Kth pixel PXL, $V_n$ may be defined as a computed value of an IR rise of the entire vertical low voltage line EVSSC, and Vmeasure may be defined as a measured value of a rise of a low voltage for the entire vertical low voltage line EVSSC.

A voltage stored in at least one of the first capacitor CP1 to the Nth capacitor CPn may be selected as the compensation voltage Vcomp based on the control signal CON, and the compensation voltage Vcomp may be reflected in the data voltage Vdata (Vdata+Vcomp) to prepare the compensation data voltage CVdata (S40). To this end, the third switch SW3 may be turned on.

The display panel may be driven based on the compensation data voltage CVdata (S50).

Meanwhile, in the above description, as an example, a step of sensing a voltage capable of compensating for a rise of the low voltage (EVSS rising voltage) of the display panel (S10) is performed every time. However, when the change in the low voltage for each gradation of the data signal is converted into data, the compensation voltage storage units CP1 to CPn may be configured so that a voltage capable of compensating for the rise of the low voltage (EVSS rising voltage) may be automatically generated and read in response to a gradation change. That is, the step of sensing the voltage capable of compensating for the rise of the low voltage (EVSS rising voltage) of the display panel (S10) may be performed only before shipment of the device to convert the change in the low voltage for each gradation of the data signal into data.

In this case, after the device is shipped, the device may be driven by the following steps (S20 to S50) after excluding the step of sensing the voltage capable of compensating for the rise of the low voltage (EVSS rising voltage) of the display panel (S10).

In addition, the above-described device and a driving method based thereon may be performed only when an image displayed on the display panel rapidly changes (moving image) or a severe grayscale change occurs. In addition, when a grayscale change is insignificant or a still image is displayed, an unnecessary compensation operation may be minimized or skipped to reduce power consumption.

As described above, the present disclosure has an effect of being able to improve display quality by improving a problem of rising of the low voltage supplied to the display panel. In addition, the present disclosure has an effect of being able to uniformize display quality by improving a problem that luminance of the display panel decreases as a distance from an input terminal of the low voltage increases. In addition, the present disclosure has an effect of being able to compensate for luminance non-uniformity caused by process deviation since the low voltage line wired in the vertical direction in the active area may be directly sensed.

It will be apparent to those skilled in the art that various modifications and variations may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device comprising:

a display panel including an active area and a non-active area;

a low voltage line configured to supply a low voltage to the display panel;

a timing controller configured to output a data signal for displaying an image on the display panel; and a data driver configured to convert the data signal into a data voltage to be supplied to the display panel and output the converted data voltage, wherein the data driver comprises a voltage compensator configured to prepare a compensation voltage for compensating for a rise of the low voltage, reflect the compensation voltage in the data voltage, and output the resultant voltage as a compensation data voltage, wherein the voltage compensator comprises:

a compensator configured to store a voltage for compensating for the rise of the low voltage; and a controller configured to control the compensator, wherein the voltage compensator comprises a first switch located between the low voltage line and the compensator to sense the low voltage; and wherein the first switch operates in response to a first switch signal output from the controller.

2. The display device according to claim 1, wherein the compensator comprises a plurality of capacitors connected in series to store a voltage for compensating for the rise of the low voltage.

3. The display device according to claim 2, wherein the compensator comprises a second switch configured to operate together with the first switch in response to a second switch signal output from the controller, and wherein the first switch and the second switch are simultaneously turned on to sense the low voltage.

4. The display device according to claim 3, wherein the compensator comprises a third switch configured to operate in response to a third switch signal output from the controller, and wherein the third switch is turned on so that a data voltage output from the controller is applied through an input terminal of the compensator.

5. The display device according to claim 4, wherein the compensator operates in response to a compensation control signal output from the controller, and comprises a compensation voltage selector configured to select a voltage stored in at least one of the plurality of capacitors to read the selected voltage as a compensation voltage, and to reflect the read compensation voltage in the data voltage.

6. The display device according to claim 1, wherein the timing controller analyzes the data signal input from outside to calculate an IR rise rate of different portions of the low voltage line corresponding to each pixel connected thereto, and outputs a control signal for controlling the controller based on the IR rise rate.

7. The display device according to claim 1, wherein the low voltage line comprises:

a first low voltage line disposed in a first direction on one side of the non-active area;

a second low voltage line located at an upper end of the non-active area, connected to the first low voltage line, and disposed in a second direction perpendicular to the first direction; and a plurality of third low voltage lines located in the active area, connected to the second low voltage line, and disposed in the first direction, wherein the voltage compensator senses the low voltage supplied through each of the plurality of third low voltage lines.

8. A method of driving a display device comprising:

analyzing a data signal input from outside to calculate an IR rise rate of different portions of a low voltage line corresponding to each pixel connected thereto;

selecting at least one voltage for compensating for a rise of a low voltage based on the IR rise rate and reading the selected voltage as a compensation voltage;

reflecting the read compensation voltage in a data voltage and outputting the resultant voltage as a compensation data voltage; and driving a display panel based on the compensation data voltage.

* * * * *